(12) United States Patent
Wu

(10) Patent No.: US 10,308,212 B2
(45) Date of Patent: Jun. 4, 2019

(54) PEDESTRIAN AND VEHICLE PROTECTION SYSTEM

(71) Applicant: THUNDER POWER NEW ENERGY VEHICLE DEVELOPMENT COMPANY LIMITED, Central (HK)

(72) Inventor: Tai-Te Wu, Taoyuan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 195 days.

(21) Appl. No.: 15/291,345

(22) Filed: Oct. 12, 2016

(65) Prior Publication Data

US 2017/0182970 A1    Jun. 29, 2017

Related U.S. Application Data

(63) Continuation of application No. 14/981,962, filed on Dec. 29, 2015, now Pat. No. 9,511,741.

(51) Int. Cl.
*B60R 21/36* (2011.01)
*B60R 21/0134* (2006.01)
(Continued)

(52) U.S. Cl.
CPC ............ *B60R 21/36* (2013.01); *B60R 19/205* (2013.01); *B60R 21/0134* (2013.01);
(Continued)

(58) Field of Classification Search
CPC ................ B60R 21/0134; B60R 21/36; B60R 2021/23332; B60R 21/013;
(Continued)

(56) References Cited

U.S. PATENT DOCUMENTS

| 5,646,613 A | 7/1997 | Cho |
| 5,732,785 A | 3/1998 | Ran et al. |

(Continued)

FOREIGN PATENT DOCUMENTS

| DE | 102 03 287 A1 | 8/2003 |
| DE | 202011109880 U1 | 7/2012 |

(Continued)

OTHER PUBLICATIONS

European Search Report for EP 16 20 7051 dated May 26, 2017, 8 pages.

(Continued)

*Primary Examiner* — Jason Holloway
(74) *Attorney, Agent, or Firm* — Kilpatrick Townsend & Stockton LLP

(57) ABSTRACT

The present disclosure is directed to a pedestrian protection system that includes a first sensor that generates a first signal indicating a hazard condition in front of a vehicle. The pedestrian protection system may also include an external airbag system that deploys an external airbag outside of the vehicle. In operation, a processor receives the first signal from the first sensor, processes the first signal to detect the hazard condition, and activates the external airbag system in response to the detected hazard condition to protect at least one of a pedestrian and the vehicle.

14 Claims, 4 Drawing Sheets

(51) Int. Cl.
*B60R 19/20* (2006.01)
*B60R 21/34* (2011.01)
*B60R 21/00* (2006.01)

(52) U.S. Cl.
CPC . *B60R 2021/003* (2013.01); *B60R 2021/0004* (2013.01); *B60R 2021/0006* (2013.01); *B60R 2021/346* (2013.01)

(58) Field of Classification Search
CPC .... B60R 2021/23107; B60R 2021/138; B60R 19/205; B60R 19/40; B60R 19/42; B60R 21/34; B60R 2021/0011; B60R 2021/0004; B60R 2021/0006; B60R 2021/003
See application file for complete search history.

(56) References Cited

U.S. PATENT DOCUMENTS

| | | | |
|---|---|---|---|
| 5,959,552 A | 9/1999 | Cho | |
| 6,498,972 B1 | 12/2002 | Rao et al. | |
| 6,920,954 B2 * | 7/2005 | Hashimoto | B60R 21/2155 180/274 |
| 6,950,014 B2 * | 9/2005 | Rao | B60R 21/013 340/435 |
| 7,359,782 B2 * | 4/2008 | Breed | B60R 21/0134 180/274 |
| 7,543,677 B2 * | 6/2009 | Igawa | B60R 21/0134 180/274 |
| 7,757,804 B1 * | 7/2010 | Li | B60R 21/34 180/274 |
| 7,836,996 B2 * | 11/2010 | Kitte | B60R 21/36 180/271 |
| 8,463,502 B2 * | 6/2013 | Baumann | B60R 21/0134 701/45 |
| 8,493,198 B1 | 7/2013 | Vasquez et al. | |
| 9,327,676 B1 * | 5/2016 | Wu | B60R 21/36 |
| 9,511,741 B1 | 12/2016 | Wu | |
| 2002/0093180 A1 | 7/2002 | Breed | |
| 2003/0160866 A1 | 8/2003 | Hori et al. | |
| 2004/0262894 A1 * | 12/2004 | Kempf | B60R 21/36 280/730.1 |
| 2005/0206139 A1 * | 9/2005 | Mori | B60R 21/36 280/730.1 |
| 2005/0218632 A1 | 10/2005 | Cuevas et al. | |
| 2006/0043712 A1 * | 3/2006 | Hakki | B60R 19/205 280/735 |
| 2006/0186702 A1 | 8/2006 | Kisanuki et al. | |
| 2008/0046150 A1 * | 2/2008 | Breed | B60R 21/0134 701/45 |
| 2008/0119993 A1 * | 5/2008 | Breed | B60R 19/205 701/46 |
| 2008/0309060 A1 * | 12/2008 | Hakki | B60R 19/205 280/770 |
| 2009/0050394 A1 * | 2/2009 | Takahashi | B60R 21/0134 180/274 |
| 2009/0267366 A1 | 10/2009 | Vodavoz | |
| 2010/0057305 A1 * | 3/2010 | Breed | B60R 19/205 701/47 |
| 2013/0333972 A1 | 12/2013 | Rydsmo et al. | |
| 2017/0182961 A1 | 6/2017 | Wu | |

FOREIGN PATENT DOCUMENTS

| | | |
|---|---|---|
| EP | 3187378 A1 | 7/2017 |
| EP | 3187387 A1 | 7/2017 |
| JP | 2006036184 A | 2/2006 |
| JP | 2006137322 A | 6/2006 |
| WO | 2008/037259 A1 | 4/2008 |

OTHER PUBLICATIONS

European Search Report for EP 16205751 dated Mar. 2, 2017, 8 pages.
U.S. Appl. No. 14/981,963, filed Dec. 29, 2015 Final Office Action dated May 2, 2017, all pages.
U.S. Appl. No. 14/981,962, filed Dec. 29, 2015 Non-Final Office Action dated Mar. 14, 2016, all pages.
U.S. Appl. No. 14/981,962, filed Dec. 29, 2015 Final Office Action dated May 19, 2016, all pages.
U.S. Appl. No. 14/981,963, filed Dec. 29, 2015 Non-Final Office Action dated Apr. 13, 2016, all pages.
U.S. Appl. No. 14/981,963, filed Dec. 29, 2015 Final Office Action dated Aug. 16, 2016, all pages.
European Examination Report dated Apr. 20, 2018 in the corresponding European Application(Application No. 16207051.0).
U.S. Appl. No. 14/981,963, filed Dec. 29, 2015 Non-Final Office Action dated Dec. 12, 2017, all pages.

* cited by examiner

PEDESTRIAN AND VEHICLE PROTECTION SYSTEM

CROSS REFERENCE TO RELATED APPLICATION

The present application is a continuation of U.S. Nonprovisional patent application Ser. No. 14/981,962, filed Dec. 29, 2015, the entire disclosure of which is hereby incorporated by reference.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Some vehicles may include one or more safety systems for protecting vehicle occupants. For example, a vehicle may include seatbelts that restrain movement of a vehicle while braking and/or during a collision. Some vehicles may also include airbag systems that cushion a vehicle occupant during an accident. For example, during an accident internal airbags may deploy to cushion and/or block contact between the vehicle occupants and portions of the vehicle.

BRIEF SUMMARY OF THE INVENTION

The present disclosure is directed to a pedestrian protection system that includes a first sensor that generates a first signal indicating a hazard condition in front of a vehicle. The pedestrian protection system may also include an external airbag system that deploys an external airbag outside of the vehicle. In operation, a processor receives the first signal from the first sensor, processes the first signal to detect the hazard condition, and activates the external airbag system in response to the detected hazard condition to protect at least one of a pedestrian and the vehicle.

The present disclosure is also directed to a pedestrian protection system that includes a first sensor configured to generate a first signal indicating a hazard condition behind a vehicle. The pedestrian protection system may also include an external airbag system that deploys an external airbag outside of the vehicle. In operation, a processor receives the first signal from the first sensor, processes the first signal to detect the hazard condition, and activates the external airbag system in response to the detected hazard condition to protect at least one of the pedestrian and the vehicle.

Another aspect of the disclosure includes a method for deploying a pedestrian protection system. The method includes receiving a first signal from a first sensor, the first signal indicating a first hazard condition. The method then detects the first hazard condition in response to the first signal. After detecting the first hazard condition, the method then continues by activating an external airbag system to deploy a first airbag to protect at least one of a pedestrian and a vehicle.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION OF THE INVENTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments disclosed below include a pedestrian and vehicle protection system that deploys external airbags to block and/or cushion contact between a vehicle carrying the external airbags and pedestrians, animals, other vehicles, and/or stationary objects (e.g., wall, vehicles). By cushioning and/or blocking contact, the airbags may block or limit damage to the vehicle, pedestrians, animals, other vehicles, etc. As will explained below, the pedestrian and vehicle protection system may include multiple airbags that are positioned on one or more sides of the vehicle (e.g., front, rear, sides). In operation, the pedestrian and vehicle protection system determines when the airbags deploy by using a controller that connects to one or more sensors. The controller uses feedback from the sensors to detect a hazard condition (e.g., possible or likely contact between the vehicle and another object) and in response to the detected hazard condition activates one or more airbags. In some embodiments, the pedestrian and vehicle protection system may determine whether an object is in a tire's path of movement (e.g., pedestrian foot) or if there will likely be an object in the tire's path of movement. If so, then the pedestrian and vehicle protection system activates one or more airbags to block and/or move the object out of the tire's path of movement.

Figure 1:
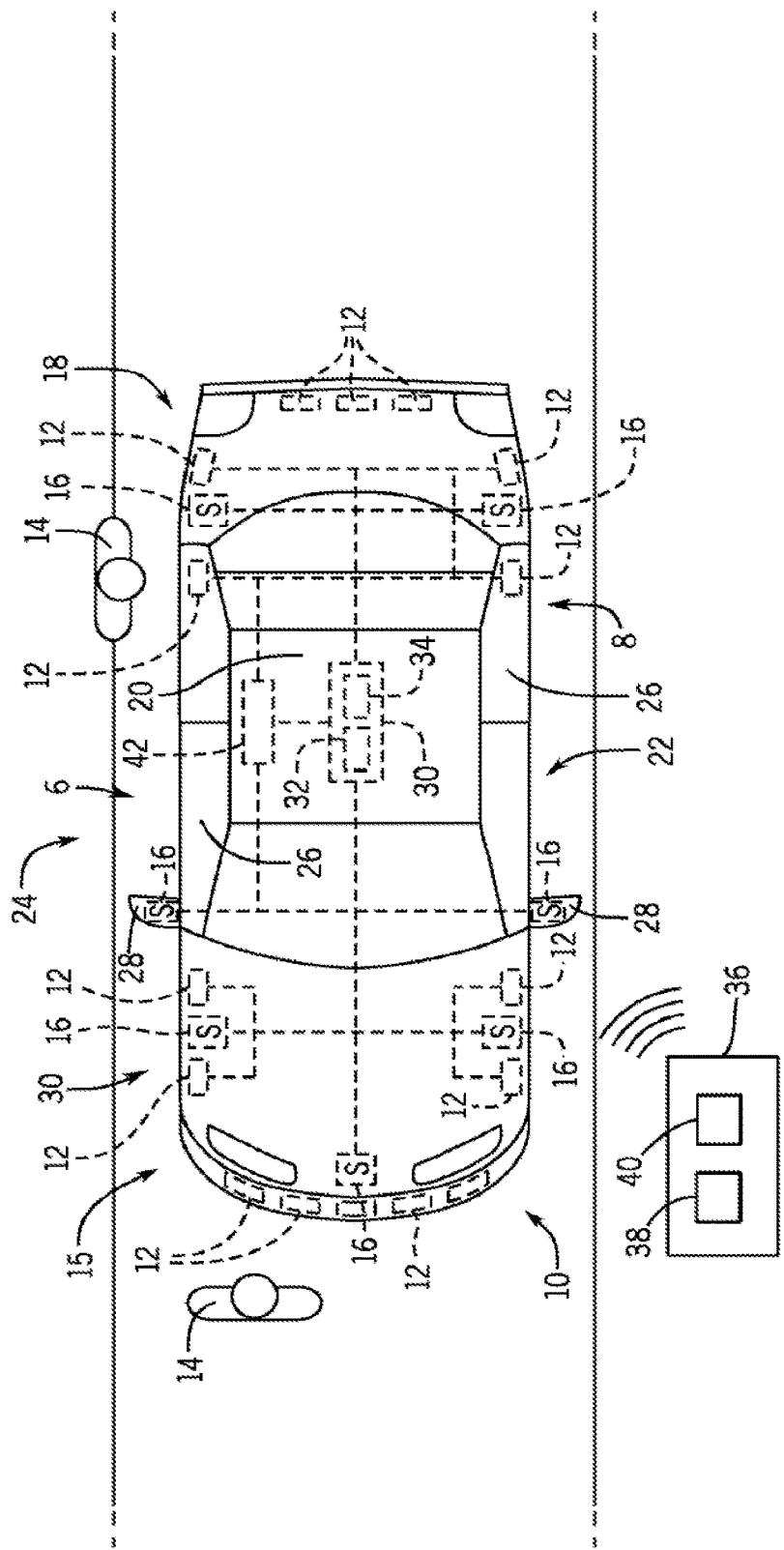
FIG. 1 is a top view of an embodiment of a vehicle with a pedestrian and vehicle protection system.

FIG. 1 is a top view of an embodiment of a vehicle 6 with a pedestrian and vehicle protection system 8. The pedestrian and vehicle protection system 8 includes an external airbag system 10 that deploys airbags 12 outside of the vehicle 6 that may protect pedestrians 14 (e.g., people, animals) as well as the vehicle 6 from injury and/or damage. For example, if a pedestrian steps in front of the vehicle 6, the pedestrian and vehicle protection system 8 may deploy one or more of the airbags 12 positioned at the front 15 of the vehicle 6 to cushion the impact between the pedestrian 14 and the vehicle 6. By cushioning the impact, the airbag 12 may block or reduce injury to the pedestrian 14 as well as possible damage to the vehicle 6. While FIG. 1 illustrates a car as the vehicle 6, the vehicle 6 may be any number of other vehicles (e.g., car, truck, motorcycle, etc.).

The pedestrian and vehicle protection system 8 includes a variety of components that operate together in order to determine a hazard condition (e.g., approaching vehicle, approaching stationary structure, approaching pedestrian) and then activates the external airbag system 10 in response to the detected hazard condition. These components may include a variety of collision sensors 16 placed at different locations on the vehicle 6. For example, the collision sensors 16 may couple to the front 15 of the vehicle 6; the back 18 of the vehicle 6; on top 20 of the vehicle 6; and sides 22, 24 of the vehicle 6 (e.g., doors 26, side mirrors 28). In this way, the pedestrian and vehicle protection system 8 may enable 360-degree hazard detection. However, in some embodiments the vehicle 6 may only have collision sensors 16 that enable hazard detection from one direction (e.g., hazards approaching the rear 18 of the vehicle 6).

The collision sensors 16 may include optical cameras, infrared cameras, motion detectors, radar, lasers, ultrasonic sensors, and/or any other sensor(s). In some embodiments, the pedestrian and vehicle protection system 8 may include sensor packages that include one or more collision sensors 16 (e.g., optical cameras, infrared cameras, motion detectors, radar, lasers, ultrasonic sensors, etc.). By including a variety of collision sensors 16, the pedestrian and vehicle protection system 8 may provide redundant detection of hazards 12 in different environmental conditions. For example, during daylight hours, the optical camera may enable hazard detection, but at night or in low light conditions the optical camera may not be able to identify hazards. In these situations, another collision sensor 16, such as an infrared camera or radar, may then provide hazard detection. In other words, when the capability of one collision sensor 16 is degraded another collision sensor 16 may still detect hazards. Accordingly, the pedestrian and vehicle protection system 8 may provide continuous or near continuous hazard detection in a variety of conditions such as rain, low light, snow, fog, sand/dust storms, among others.

In operation, the collision sensors 16 transmit signals (e.g., wirelessly, through wired connections) to a controller 30 (e.g., computer). The controller 30 may include one or more processors 32 that execute instructions stored on one or more memories 34 to process the signals (e.g., data) from the collision sensors 16. For example, the controller 30 may receive a signal (e.g., data) from an optical camera. The processor 32 may then execute a program stored on the memory 34 that recognizes objects (e.g., cars, trucks, bicycles, pedestrians, animals, stationary objects, etc.) in images taken by the optical camera. If the processor 32 detects a hazard, the processor 32 executes instructions to activate the external airbag system 10. For example, the controller 30 may detect a hazard in less than 0.1, 0.3, 0.5, 1.0, 1.5 seconds, etc. In some embodiments, the controller 30 may continuously receive feedback from the collision sensor 16 enabling the controller 30 to track changes of the potential hazard and determine if the changes alter the hazard condition (e.g., increase the risk of collision, reduce the risk of collision, or remove the risk of collision). These changes may include changes in the speed of the hazard; changes in the distance between the hazard and the vehicle 6; changes in the direction of travel of the hazard; etc. For example, threshold distances, threshold speeds, etc. may be stored in the memory 34 and accessed by the processor 32 to determine whether a hazard condition exists. Furthermore, in some embodiments, the controller 30 may simultaneously receive feedback from multiple collision sensors 16 (e.g., collisions sensors 16 with the same or overlapping coverage) enabling the controller 30 to more accurately identify a hazard (e.g., cross-reference, verify) and determine if a hazard condition or situation exists.

In some embodiments, the pedestrian and vehicle protection system 8 may connect to a remote server 36 that processes the signals from the collision sensors 16. Indeed, instead of including processor(s) 32 on the vehicle 6 that are capable of processing the feedback from the collision sensors 16, a remote server 36 with one or more processors 38 may process signals from the collision sensors 16 using instructions (e.g., programs) stored on one or more memories 40. For example, the pedestrian and vehicle protection system 8 may include a transmitter/receiver 42 that receives signals either directly from the collision sensors 16 or receives the signals through the controller 30. The transmitter/receiver 42 then transmits the sensor signals (e.g., through cellular networks, wireless networks, etc.) to the server 36, which then processes the signals and identifies whether a hazard condition exists. If the server 36 identifies a hazard condition after processing signals from the collision sensors 16, then the server 36 transmits a signal to the controller 30 to activate the airbags 12. In some embodiments, the controller 30 and the server 36 may redundantly process signals from the collision sensors 16, or the server 36 may only process feedback from the collision sensor 16 if the controller 30 is unable to do so.

As illustrated, the vehicle protection system 8 may include one or more airbags 12 on the front 15, back 18, and/or sides 22, 24 of the vehicle 6 (e.g., 1, 2, 3, 4, 5, or more). In embodiments with multiple airbags 12, the pedestrian and vehicle protection system 8 may control/activate some or all of the airbags 12 on a particle side of the vehicle 6. For example, if pedestrian and vehicle protection system 8 determines that the hazard will impact only a portion of the front 15 of the vehicle 6, the pedestrian and vehicle protection system 8 may deploy a subset of the total number of airbags on the front 15. In other words, the pedestrian and vehicle protection system 8 may activate the airbags that will or will most likely contact the hazard, instead of all of the airbags 12 on a particular side of the vehicle 6.

Figure 2:
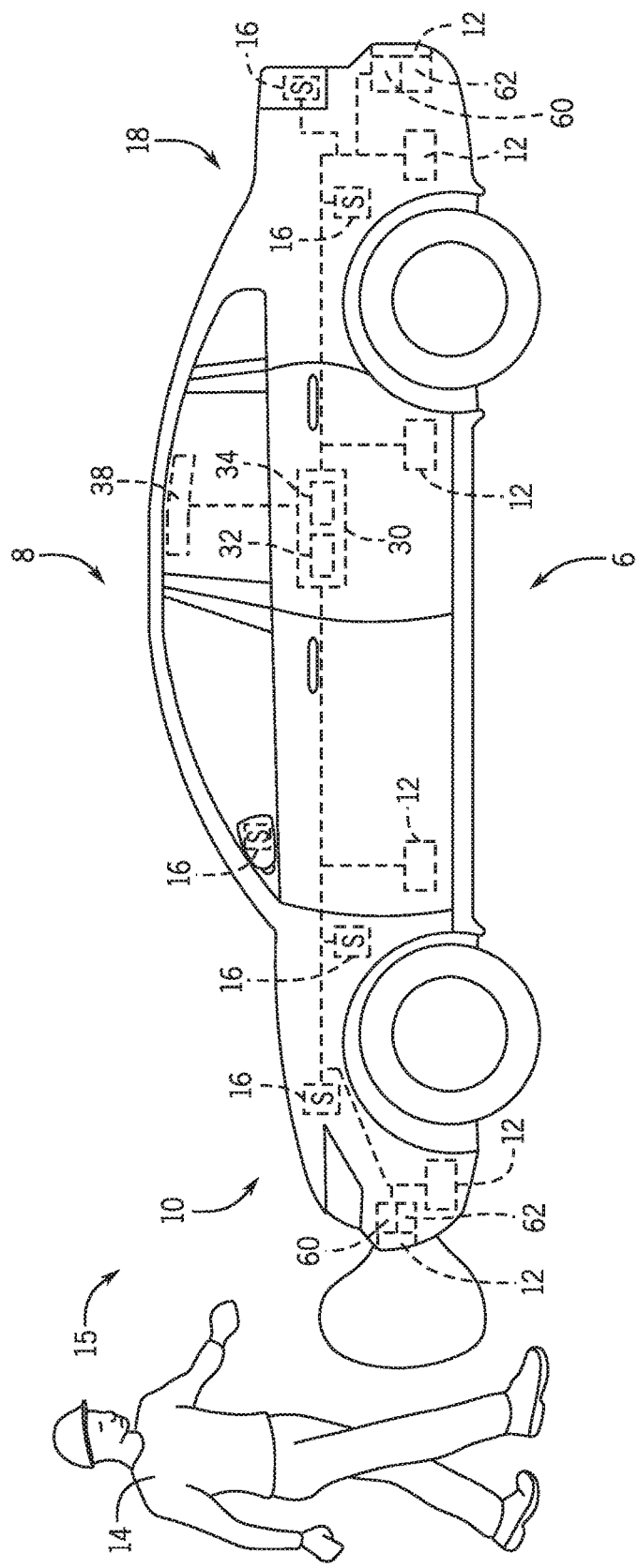
FIG. 2 is a side view of an embodiment of a vehicle with a pedestrian and vehicle protection system.

FIG. 2 is a side view of an embodiment of a vehicle 6 with a pedestrian and vehicle protection system 8. As explained above, the pedestrian and vehicle protection system 8 uses signals from collision sensors 16 to determine if a hazard condition exists. If a hazard condition exists, the pedestrian and vehicle protection system 8 deploys an airbag 12 from the external airbag system 10. In order to deploy an airbag 12, the external airbag system 10 includes an inflator 60. In some embodiments, the inflator 60 may be chemicals (e.g., sodium azide (NaN3) and potassium nitrate (KNO3)) and an ignitor that ignites the chemicals in response to a signal from the controller 30. Once ignited, the chemicals may rapidly turn into a gas, which inflates the airbag 12. In some embodiments, the inflator 60 may be compressed air stored in a container on the vehicle 6. In operation, a valve may release the compressed air in response to a signal from the controller 30, which then inflates the airbag(s) 12.

As illustrated, once deployed the airbag 12 may cushion an impact between the vehicle 6 and a pedestrian 14, another vehicle (e.g., car, bicycle, motorcycle, moped, truck), a stationary object (e.g., wall, vehicle), etc. In this way, the pedestrian and vehicle protection system 8 may block or reduce damage or injury to the vehicle 6 and whatever the vehicle 6 impacts or that impacts the vehicle 6. For example, the vehicle 6 may be not moving, but the pedestrian and vehicle protection system 8 may detect an approaching hazard that could possible damage the vehicle 6. In this situation, the vehicle 6 may deploy the airbag 12 to protect the vehicle 6 from the approaching hazard.

In some embodiments, the external airbag system 10 may include a retraction system 62. After the airbag 12 deploys the retraction system 62 may retract the airbag 12 either for storage or for immediate reuse. For example, the retraction system 62 may include a pump that removes the gas from the airbag enabling the airbag 12 to contract and withdraw into the vehicle 6. In some embodiments, the retraction system 62 may include a mechanical actuator that pulls the deployed airbag 12 back into the vehicle 6 after releasing the gas.

Figure 3:
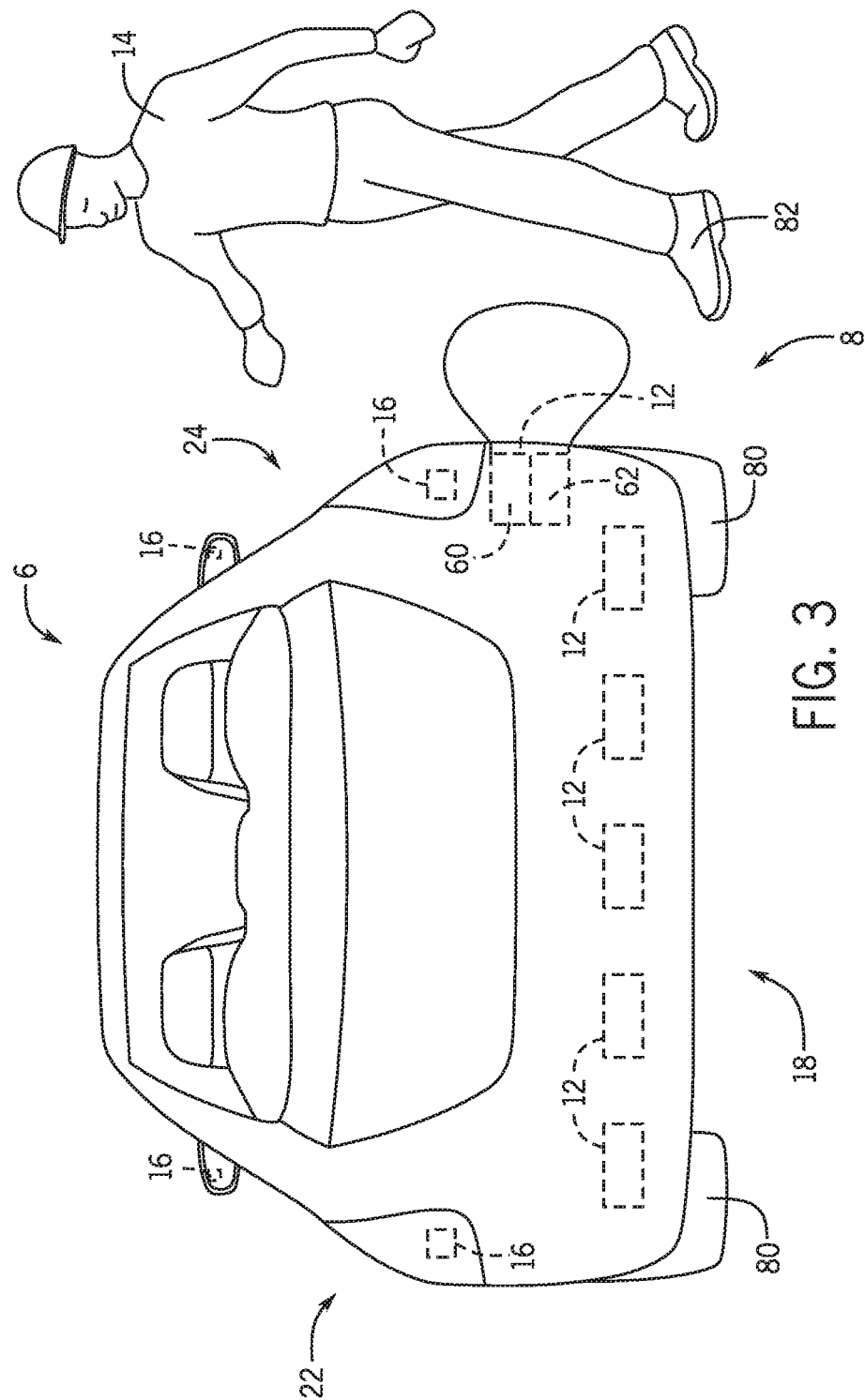
FIG. 3 is a rear view of an embodiment of a vehicle with a pedestrian and vehicle protection system.

FIG. 3 is a side view of an embodiment of vehicle 6 with a pedestrian and vehicle protection system 8. As explained above, the pedestrian and vehicle protection system 8 uses signals from collision sensors 16 to determine if a hazard condition exists. If a hazard condition exists, the pedestrian and vehicle protection system 8 deploys an airbag 12 from the external airbag system 10. Once deployed, the airbag 12 may cushion an impact between the vehicle 6 and a pedestrian 14, another vehicle (e.g., car, bicycle, motorcycle, moped, truck), a stationary object (e.g., wall, vehicle), etc. In this way, the pedestrian and vehicle protection system 8 may block or reduce damage or injury to the vehicle 6 and whatever the vehicle 6 impacts or that impacts the vehicle 6. For example, the vehicle 6 may be not moving, but the pedestrian and vehicle protection system 8 may detect an approaching hazard that could possible damage the vehicle 6. In this situation, the vehicle 6 may deploy the airbag 12 to protect the vehicle 6 from the approaching hazard.

In some situations, the pedestrian and vehicle protection system 8 may be used to push a potential hazard away from a tire 80 or block movement of an object from entering a tire's path of movement. In other words, the pedestrian and vehicle protection system 8 may use collision sensors 16 to recognize that an object may be in a tire's path of movement and then deploys one or more airbags 12 to move the object out of the path of movement (e.g., a foot). The pedestrian and vehicle protection system 8 may also deploy an airbag 12 when the pedestrian and vehicle protection system 8 detects that an object may enter the tire's path of movement. For example, pedestrian and vehicle protection system 8 may deploy an airbag 12 to block a pedestrian's foot 82 from entering a tire's path of movement.

As illustrated, in FIGS. 1 and 2 the pedestrian and vehicle protection system 8 may include one or more airbags 12 on the sides 22, 24 of the vehicle 6 (e.g., 1, 2, 3, 4, 5, or more). For example, the pedestrian and vehicle protection system 8 may include an airbag 12 on opposite sides of each tire 80 (e.g., wheel well). In some embodiments, the pedestrian and vehicle protection system 8 may activate one or more of the airbags 12 on the sides 22, 24 depending on the direction of travel and/or where a hazard may contact the vehicle 6. For example, if an object is in front of or could possible get in front of a tire 80, and the vehicle's direction of travel is in a forward direction, the pedestrian and vehicle protection system 8 will activate the airbag in front of the tire 80 to move and/or block the object from remaining and/or entering in front of the tire 80. Likewise, if the vehicle's direction of travel is in reverse, the pedestrian and vehicle protection system 8 may activate the airbag 12 behind the tire 80 to move and/or block the object from remaining and/or entering behind the tire 80. In other words, the pedestrian and vehicle protection system 8 may activate the airbags 12 that will or will most likely contact the hazard, instead of activating all of the airbags 12 on a particular side (e.g., sides 22, 24) of the vehicle 6.

As explained above, the external airbag system 10 may include a retraction system 62. After the airbag 12 deploys the retraction system 62 may retract the airbag 12 either for storage and later resetting (e.g., replacement of chemicals), or for immediate reuse. For example, the retraction system 62 may include a pump that removes the gas from the airbag enabling the airbag 12 to contract and withdraw into the vehicle 6. In some embodiments, the retraction system 62 may include a mechanical actuator that pulls the deployed airbag 12 into the vehicle 6 after releasing the gas.

Figure 4:
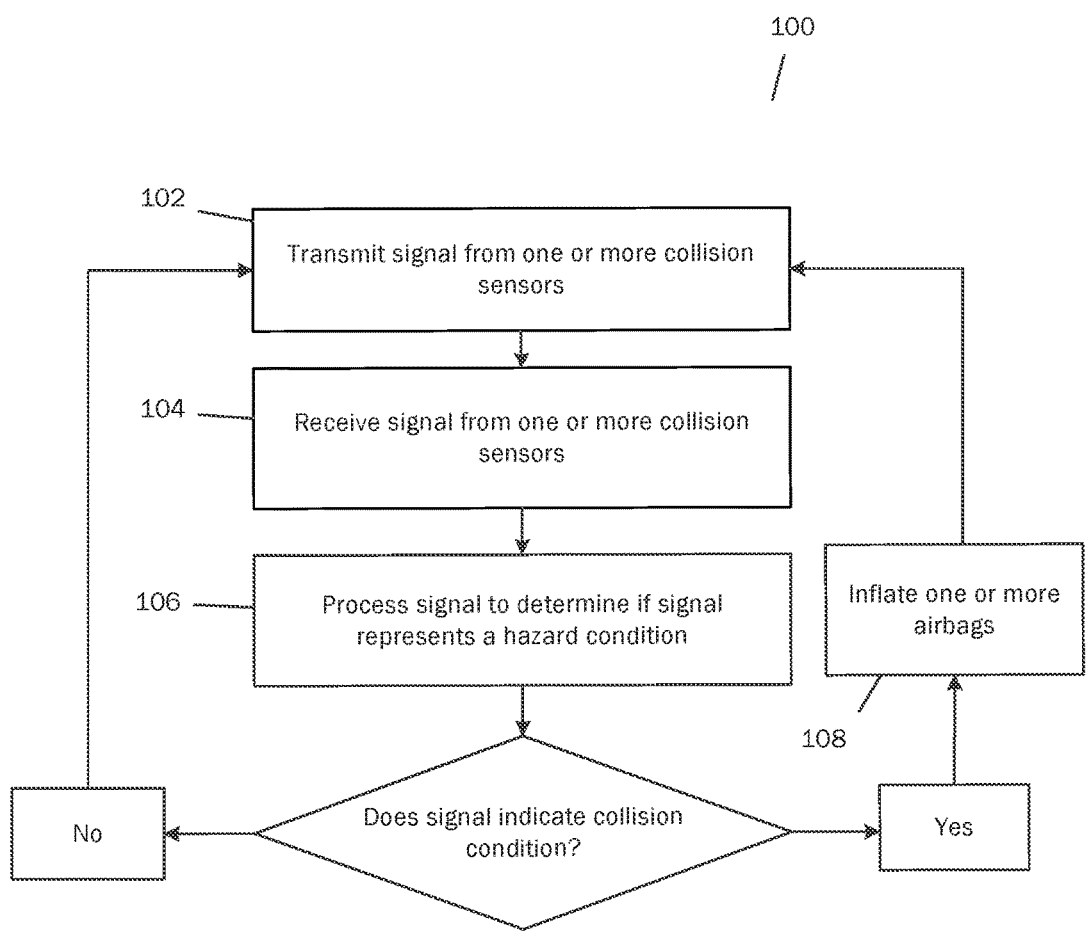
FIG. 4 is a flow chart of an embodiment of a method illustrating operation of a pedestrian and vehicle protection system.

FIG. 4 is a flow chart 100 of an embodiment of a method of operation of the pedestrian and vehicle protection system 8. In some embodiments, operation of the pedestrian and vehicle protection system 8 starts by transmitting signal(s) from one or more collision sensors 16 (step 102). The controller 30 and/or the server 36 then receive the signal(s) from the one or more collision sensors (step 104). After receiving the signals, the controller 30 and/or server 36 processes the signals using one or more programs stored in the memories 34 to determine if there is a hazard condition (e.g., whether nearby traffic is likely to contact the vehicle 6 and/or if the vehicle is likely to contact a stationary object) (step 106). In some embodiments, processing the signals from the collision sensors 16 may include determining whether the vehicle is moving forwards or backwards. As explained above, the pedestrian and vehicle protection system 8 may deploy some and not all of the airbags on the sides 22, 24 of the vehicle 6 depending on the location of the hazard (e.g., whether a pedestrian's foot in the tire's path of movement) and the direction of vehicle travel. If no hazard condition exists then the collision sensors 16 may continue to transmit signals from the collision sensors 16 to the controller 30 and/or server for monitoring. If the controller 30 and/or server 36 detect a hazard condition then the controller 30 inflates one or more airbags 12 (step 108).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A pedestrian protection system, comprising:
a first sensor configured to generate a first signal indicating an object is detected;
an external airbag system comprising a first external airbag coupled to a vehicle on a first side of a wheel well, wherein the external airbag system is configured to deploy the first external airbag to block an object from entering the predicted tire path of movement between a surface below the vehicle tire and a bottom surface of the vehicle; and
a processor configured to:
receive the first signal from the first sensor,
process the first signal to determine the object is in a predicted tire path of a tire of the vehicle, and
in response to determining the object is in the predicted tire path of the tire of the vehicle, activate the external airbag system to move the object out of the predicted tire path of movement and/or block an object from entering the predicted tire path.

2. The system of claim 1, comprising a second external airbag coupled to the vehicle on a second side of the wheel well, wherein the first side and the second side are on opposites sides on the wheel well.

3. The system of claim 1, wherein the first sensor is at least one of an optical camera, infrared camera, motion detector, radar, laser, and ultrasonic sensor.

4. The system of claim 1, comprising a second sensor configured to generate a second signal indicating a hazard condition, wherein the processor cross-references the first signal and the second signal to verify the hazard condition.

5. The system of claim 4, wherein the second sensor is at least one of an optical camera, infrared camera, motion detector, radar, laser, and ultrasonic sensor.

6. The system of claim 1, wherein the external airbag system includes a first retraction system that retracts the first external airbag after deployment for reuse.

7. A method for deploying a pedestrian protection system, the method being implemented by a processor configured to execute computer programs, and the method comprising:
  receiving a first signal from a first sensor, the first signal indicating an object is detected;
  processing the first signal to determine the object is in a first predicted tire path of a tire of a vehicle between a surface below the tire and a bottom surface of the vehicle;
  in response to determining the object is in a first predicted tire path of a tire of a vehicle between a surface below the tire and a bottom surface of the vehicle, activating an external airbag system to deploy a first external airbag on a first side of a wheel well to move the object out of the first predicted tire path of movement and/or block an object from entering the first predicted tire path of movement.

8. The method of claim 7, comprising a second external airbag coupled to the vehicle on a second side of the wheel well, wherein the first side and the second side are on opposites sides on the wheel well.

9. The method of claim 7, wherein the first predicted tire path of movement is in a forward direction of travel.

10. The method of claim 7, comprising receiving a second signal from a second sensor, the second signal indicating a hazard condition in the first predicted tire path of movement.

11. The method of claim 9, detecting the hazard condition in the first predicted tire path of movement in response to the second signal.

12. The method of claim 11, comprising cross-referencing the first signal and the second signal to verify the hazard condition.

13. A vehicle pedestrian protection system, comprising:
  a vehicle;
  a first sensor configured to generate a first signal indicating an object is detected;
  an external airbag system comprising a first external airbag coupled to a vehicle on a first side of a wheel well, wherein the external airbag system is configured to deploy the first external airbag to block an object from entering the predicted tire path of movement between a surface below the vehicle tire and a bottom surface of the vehicle; and
  a processor configured to:
    receive the first signal from the first sensor,
    process the first signal to determine the object is in a predicted tire path of a tire of the vehicle, and
    in response to determining the object is in the predicted tire path of the tire of the vehicle, activate the external airbag system to move the object out of the predicted tire path of movement and/or block an object from entering the predicted tire path.

14. The system of claim 13, comprising a second external airbag coupled to the vehicle on a second side of the wheel well, wherein the first side and the second side are on opposites sides on the wheel well.

* * * * *